United States Patent [19]

Coscia

[11] Patent Number: 4,491,416
[45] Date of Patent: Jan. 1, 1985

[54] OPEN MIXER FOR THE PROCESSING OF RUBBER AND PLASTICS, PROVIDED WITH AN ADDITIONAL ROLL

[75] Inventor: Giovanni A. Coscia, Varese, Italy

[73] Assignee: Rutil S.r.l., Italy

[21] Appl. No.: 511,173

[22] Filed: Jul. 6, 1983

[51] Int. Cl.³ .............................................. A21C 1/08
[52] U.S. Cl. .................................................... 366/73
[58] Field of Search ....................... 366/71, 72, 73, 70, 366/177, 301, 348, 349, 69, 100; 100/162 R, 168, 170, 172, 93 RP, 164, 165, 166; 29/110, 116 R

[56] References Cited

U.S. PATENT DOCUMENTS

| | | | |
|---|---|---|---|
| 418,045 | 12/1889 | Mitchell | 366/72 |
| 3,089,409 | 5/1963 | Tretheway | 100/162 R |
| 3,296,982 | 1/1967 | Zang | 366/73 |
| 4,310,361 | 1/1982 | Georget | 100/168 |

Primary Examiner—Robert W. Jenkins

[57] ABSTRACT

An open mill or mixer for the processing of rubber and plastics comprises an additional or third roll for a higher productivity and, when upstream of the open mill a closed mixer is provided, for a readier cooling of the mixture. The two usual rolls are not placed at the same level, but one is slightly upper, while the third additional roll engages the lower one in the bottom part thereof. The angle formed by the lines joining the center of this latter with the centers of the other two rolls is comprised between 60° and 120° and is preferably of 80°–90°. Also the third roll is motor-driven, as well as the other two and has a higher peripheral speed than the roll which is wrapped up by the mix sheet and has the lower speed. The additional roll is provided with quick approachment means, such as cylinder and piston means, and fine adjustment means for adjusting its distance to the roll with which it is designed to engage, whereby when said approachment means is in a retracted position, the mixer conventionally operates with only two rolls.

10 Claims, 3 Drawing Figures

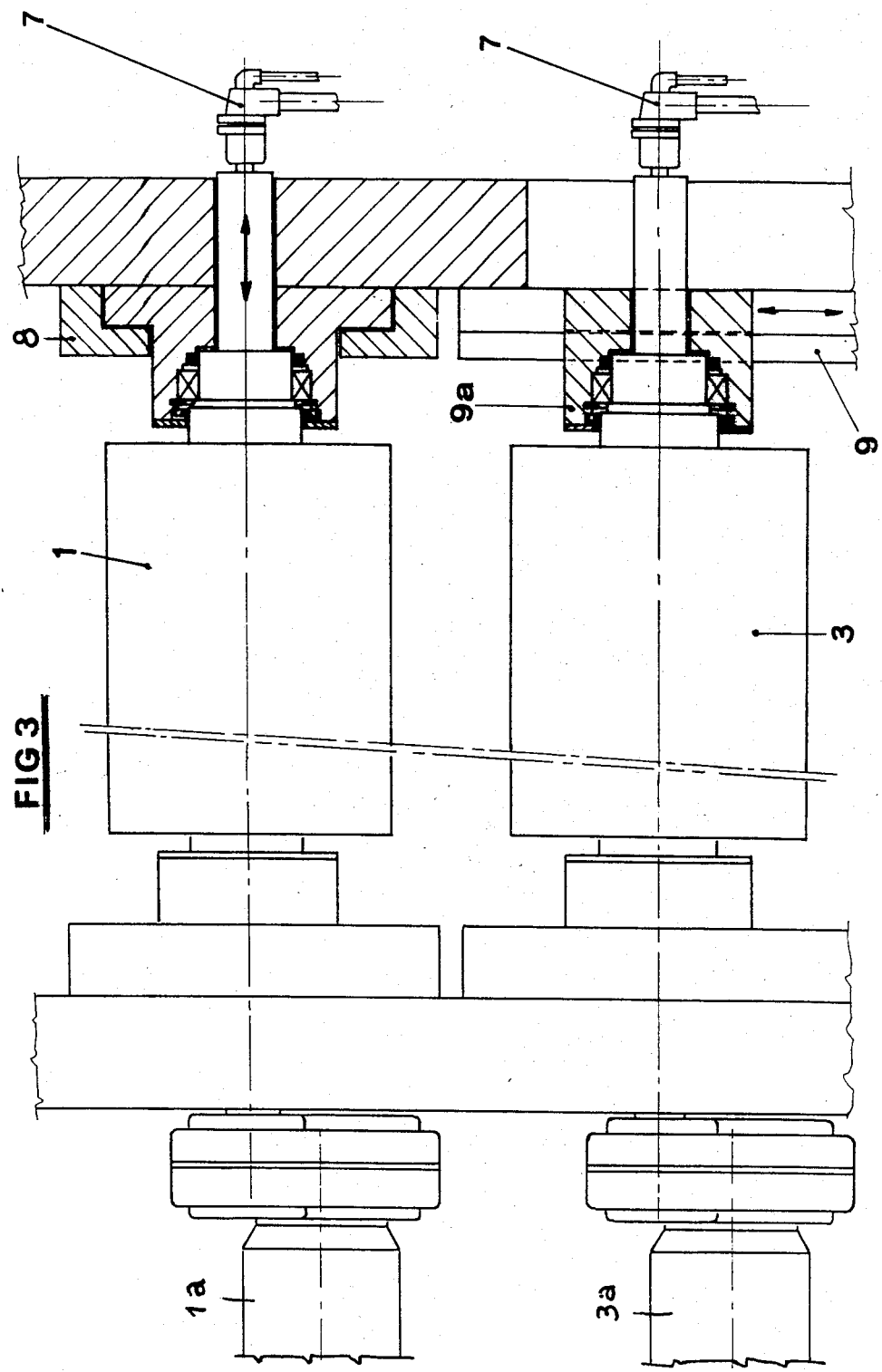

OPEN MIXER FOR THE PROCESSING OF RUBBER AND PLASTICS, PROVIDED WITH AN ADDITIONAL ROLL

BACKGROUND OF THE INVENTION

The present invention deals with an open-type mixer for rubber and plastics processing, which is provided with an additional roll.

It is known that open mills or mixers are essential in the processing of rubber and plastic material to obtain mixes with the desired compound and degree of homogeneity and temperature. They may be used either as a first stage of processing, as they receive the mix components directly from a hopper, or as second stage downstream of a closed mixer, in which case they have also a cooling function. Inside thereof in fact a cooling fluid flows, usually water.

It is however known that these prior art mixers require a number of subsequent passages of the same compound batch, before the latter can be considered ready to be used in a rubber moulding press. Furthermore, if the compound batch has already passed upstream through a closed mixer, in any case a multiplicity of passes will be necessary to reduce the mix temperature. In order to reduce the working time, it would be possible to cause the same compound batch to pass subsequently through at least a second open mixer, operating in series with the first one, but the costs and dimensions involved would be excessive, thus seriously affecting the overall economy of the process.

SUMMARY OF THE INVENTION

It is the object of the present invention to provide an improved open mixer which comprises a third additional roll, substantially positioned under the other two, therefore such as to increase the overall dimensions of the mixer in height direction only. With such an additional cylinder the compound processing and the desired temperature are obtained in a substantially shorter time, thus with a considerable increase of the production per hour in comparison with the conventional two roll-mixers.

The improved mixer according to the present invention comprises two internally cooled rolls which are rotatable about two horizontal and parallel axes, at least one of which can be adjusted as to the distance thereof from the axis of the other roll, possibly mutually engaging along a pair of cylinder generating lines, and is characterized by comprising a third additional roll also having a horizontal rotation axis, parallel and positioned at a lower height than the other two rolls, this roll also being internally cooled and provided with approachment means and adjusting means for a fine adjustment of the distance from one of said upper rolls, possibly engaging with the latter along a pair of generating lines, the three rolls being all independently motor-driven, whereby each pair of mutually engaged rolls show an opposite direction of rotation and the roll having the lowest peripheral speed is one of the two upper rolls.

According to a particular aspect of the present invention the axes of the two upper rolls are positioned on a plane inclined to the horizontal and the one mounted at a lower level of the two can come into contact also with the third additional roll. Furthermore, in a cross-section view, the angle between the lines joining the centre of the roll engageable with the other two and the centre of the other two rolls, is comprised between 60° and 120° and preferably from 80° to 90°.

Again preferably said intermediate roll will be the one on which the mix sheet is formed and therefore the roll provided with the lowest peripheral speed.

BRIEF DESCRIPTION OF THE DRAWINGS

Further features and advantages of the present invention will be clear to those skilled in the art from the following detailed description of an embodiment thereof, given by way of example with reference to the accompanying drawings wherein:

FIG. 3 is a partial cross-sectional view along the line III—III of FIG. 1.

DETAILED DESCRIPTION OF THE PREFERRED EMBODIMENT

Figure 1:
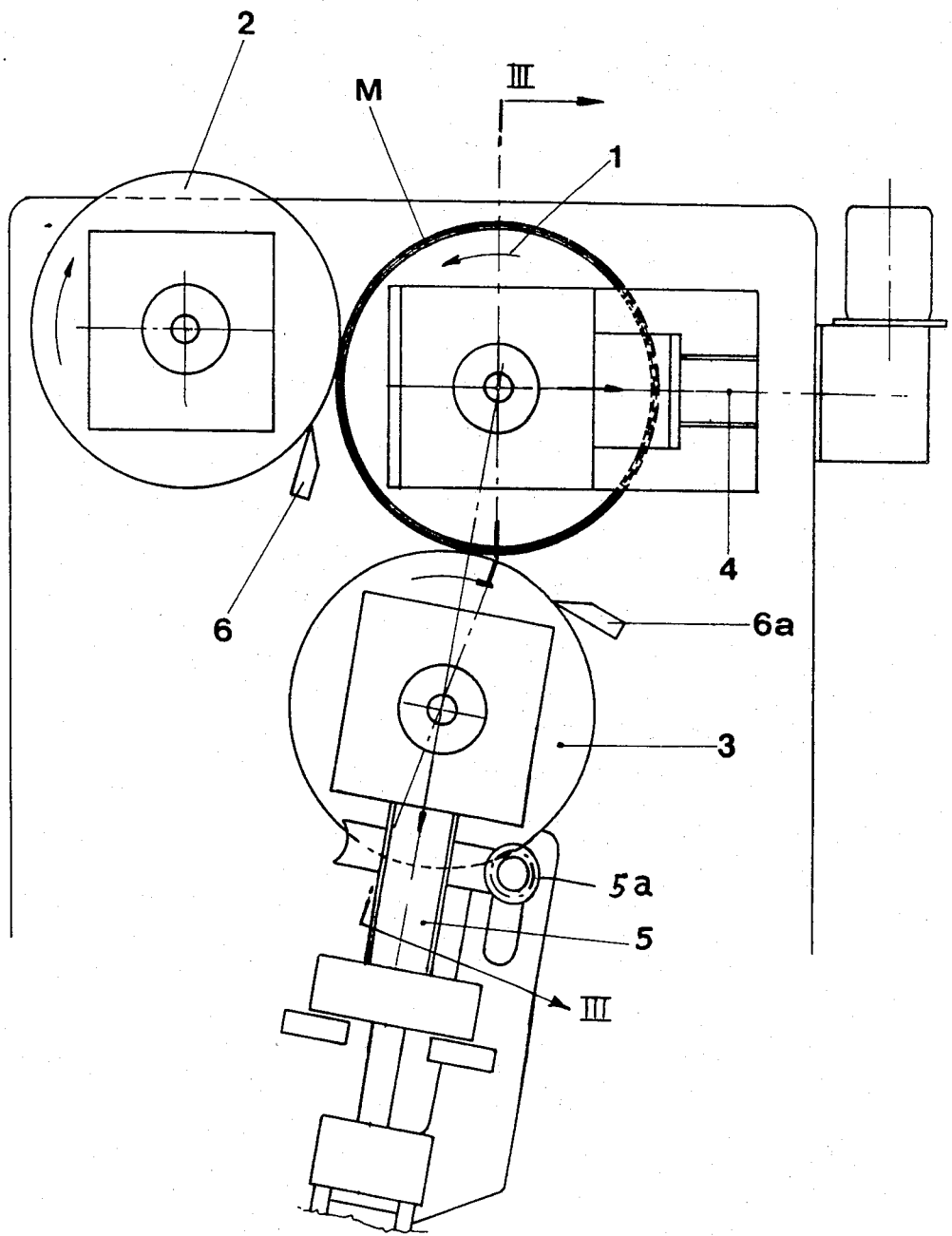
FIG. 1 is a side end view of the improved mixer according to the invention.

With reference to the drawings, the improved mixer according to the present invention comprises, in addition to the two upper rolls 1 and 2 being mutually parallel and mounted with horizontal axes, a third roll 3 mounted at a lower height than the other two. Preferably, according to the invention, the rolls 1 and 2 are positioned at different heights, but the plane comprising their axes is inclined to the horizontal by an angle $\alpha$ having preferably a value between 7° and 10°, as is better seen in FIG. 2, which shows the geometry of their placement, in such a way that the roll 2 is mounted at a higher level than the roll 1 and its axis is fixed.

The roll 1, as it is known, has quick approachment means in relationship with the fixedly mounted roll 2 and e.g. formed as a cylinder and piston 4, as well as adjusting means for a fine adjustment of the distance, such as of the screw-type, not shown in the drawing.

The third additional roll 3 is mounted under the other two, this also on quick approachment means as cylinder and piston 5, being similar to the means 4 of roll 1. The adjustment of the distance between roll 3 and roll 1, until possibly coming into contact along a generating line of each roll, is again controlled by a fine adjustment device 5a, such as of the screw type, like for adjusting the distance between rolls 1 and 2. In this way the three rolls may be mutually engaged in pairs and in the shown embodiment the intermediate roll 1 engages the other two rolls.

Figure 2:
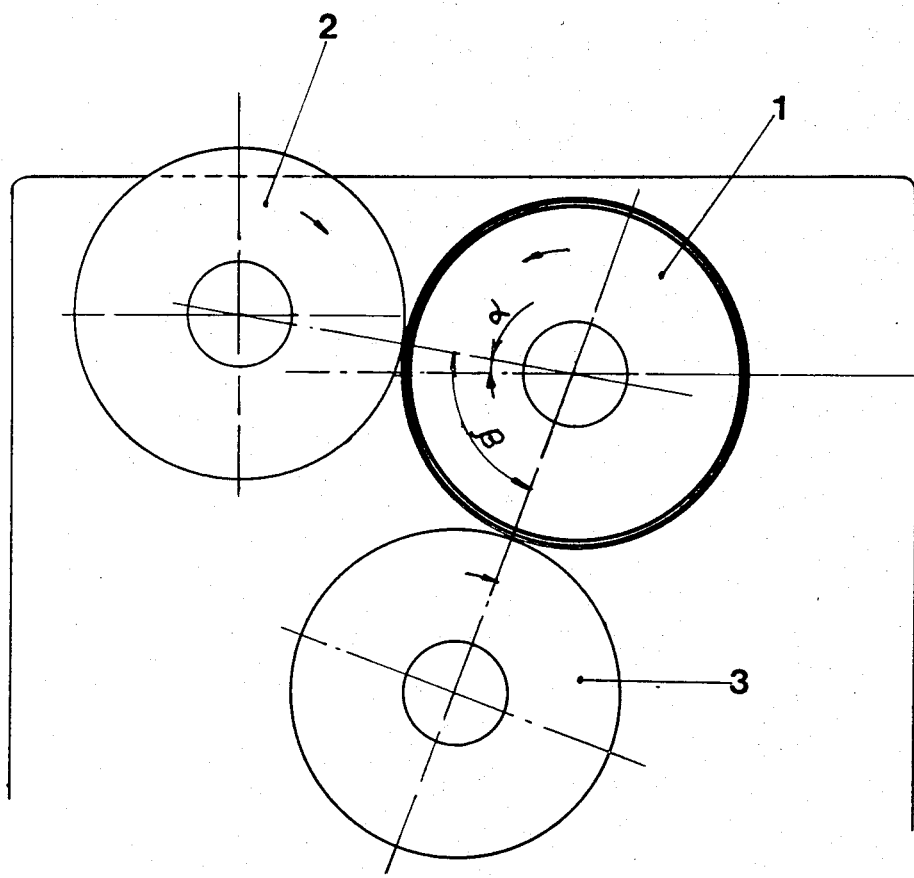
FIG. 2 is a diagrammatic cross-sectional view taken in an intermediate position along the three rolls.

With reference to FIG. 2, if the cross-section centres of the three rolls are joined together, a triangle is obtained wherein the angle $\beta$ corresponding to the centre of roll 1 is, according to the invention, in the range between 60° and 120° and preferably between 80° and 90°. These values of angle $\beta$ correspond to a more advantageous positioning of the roll 3 to accomplish the mixer action both for a better homogenization of the mix components and for a quick cooling when the material to be processed is fed from a first closed mixer, where its temperature has increased. All the three rolls are in fact run across, in a known manner, by the flow of a cooling fluid, such as water, through pipe fittings 7 (FIG. 3).

As shown in FIG. 1, the intermediate roll 1 is that on which the mix sheet M is formed, whose thickness will be a function of the nip distance existing between this roll and the other two and adjustable, as previously described, by means of screw devices associated with the quick advancement means 4 and 5. Two scrapers 6, 6a are provided on the other two rolls and mounted slightly downstream of the zone of contact with the intermediate roll 1, when considering the rotation directions as indicated on the drawing.

It should be appreciated that at the nip or contact point between two rolls, the movement of their periphery will be in the same direction, whereby the rotations of two mutually co-operating rolls are of opposite direction, whereas are the same for the rolls 2 and 3 which are spaced apart.

As the compound to be processed is fed from the top to the nip zone between rolls 1 and 2, it is obvious that these will have the directions of rotation shown in the drawing, namely counterclockwise for the roll 1 and clockwise for the roll 2, so that the compound then passes through the nip zone between the intermediate roll 1 and the additional roll 3, this latter having again a clockwise direction of rotation.

As to the speed, the roll on which the sheet of mix is being formed (the intermediate roll 1 in this case) will have the lowest peripheral speed, whereas the other two will have slightly higher peripheral speeds to give the compound a certain amount of rub. This amount shall be greater for the first roll which comes into contact with the sheet of compound and smaller for the other roll, that is the additional roll 3. Therefore this latter will have preferably a peripheral speed comprised between the slowest one of roll 1 (of the order of 15 rpm) and the faster speed of roll 2. Should the rolls have all the same diameter, one can make mention of rotational speed instead of peripheral speed.

It is obvious that if the device is in a completely retreated position, so as to allow no possibility for the compound to be processed in the nip between the rolls 1 and 3, the mixer would operate again conventionally with two rolls.

With reference to FIG. 3, the mounting details, although diagrammatic of the two rolls 1 and 3 are shown. The first one can slide with a reciprocating horizontal motion, being thrusted by the cylinder-piston 4, here not shown, along guides 8 and integrally with the pipe fitting 7 for feeding the coolant fluid. The additional roll 3 can instead slide vertically or in an inclined direction having a substantial vertical component, being also integral with the associate fitting 7, along the guide 9, as urged by the thrust of the cylinder-piston 5, not shown here, but fixed to the sliding block 9a. Rolls 1 and 3 are independently motor-driven by motors 1a and 3a respectively. Roller 2 is likewise independently motor-driven.

Possible additions and/or modifications can be performed by those skilled in the art to the described and illustrated embodiment of the improved mixer according to the present invention without departing from the scope of the invention itself.

What I claim is:

1. An improved open-type mixer for processing rubber and plastic material, comprising two internally cooled rolls which are rotatably mounted on horizontal and parallel axes, at least a first one of which can be adjusted as to the distance thereof from the axis of the second roll, until possibly engaging it along a pair of cylinder generating lines, wherein a third additional roll is provided, also having a horizontal rotation axis which is parallel and positioned at a lower height than the other two rolls, the third roll being also internally cooled and provided with quick approachment means and adjusting means for a fine adjustment of the distance from said first upper roll possibly engaging the same along a pair of generating lines, the three rolls being independently motor-driven, whereby each pair of mutually engaged rolls show an opposite direction of rotation and the roll having the lowest peripheral speed is one of the two upper rolls.

2. An open mixer according to claim 1, wherein the rotation axis of said second roll is stationary.

3. An open mixer according to claim 2, wherein the axes of the two upper rolls define a plane which is inclined to the horizontal forming an acute angle $\alpha$.

4. An open mixer according to claim 3, wherein said angle $\alpha$ is comprised in the range from 7° to 10°.

5. An open mixer according to claim 3, wherein said first roll mounted at a lower height of said two upper rolls is capable of coming into contact and generally cooperating with said additional third roll.

6. An open mixer according to claim 5, wherein the plane passing along the rotation axis of said first roll and the rotation axis of the second roll forms with the plane passing along the axis of the first roll and the rotation axis of said third roll an angle $\beta$ in the range from 60° to 120°.

7. An open mixer according to claim 6, wherein said angle $\beta$ is within the range from 80° to 90°.

8. An open mixer according to claim 5, wherein the roll having a peripheral speed lower than each of the other two rolls and on the surface of which the mix sheet is formed, is said first roll.

9. An open mixer according to claim 5, wherein the shaft of each adjustable roll is fixed to an associate cooling fluid feed fitting and is slidable along respectively horizontal and substantially vertical guides.

10. An open mixer according to claim 1, wherein the rolls of each pair of rolls capable of coming each other into contact, rotate in opposite directions.

* * * * *